(12) United States Patent
Yu et al.

(10) Patent No.: US 12,062,973 B2
(45) Date of Patent: Aug. 13, 2024

(54) SYSTEMS, METHODS, AND DEVICES FOR CURRENT SENSING

(71) Applicant: pSemi Corporation, San Diego, CA (US)

(72) Inventors: Tim Wen Hui Yu, Fremont, CA (US); Gregory Szczeszynski, Nashua, NH (US)

(73) Assignee: pSemi Corporation, San Diego, CA (US)

( * ) Notice: Subject to any disclaimer, the term of this patent is extended or adjusted under 35 U.S.C. 154(b) by 316 days.

(21) Appl. No.: 17/656,549

(22) Filed: Mar. 25, 2022

(65) Prior Publication Data

US 2023/0308003 A1    Sep. 28, 2023

(51) Int. Cl.
*H02M 1/00* (2007.01)

(52) U.S. Cl.
CPC ....... *H02M 1/0006* (2021.05); *H02M 1/0009* (2021.05)

(58) Field of Classification Search
CPC ... H02M 1/0006; H02M 1/0009; H02M 3/158
See application file for complete search history.

(56) References Cited

U.S. PATENT DOCUMENTS

| | | |
|---|---|---|
| 7,233,473 B2 | 6/2007 | Donaldson et al. |
| 8,619,445 B1 | 12/2013 | Low et al. |
| 10,686,367 B1 | 6/2020 | Low |
| 10,958,166 B1 | 3/2021 | Low et al. |
| 2014/0049238 A1* | 2/2014 | Hu .................... G05F 1/10 323/282 |

* cited by examiner

*Primary Examiner* — Kyle J Moody
(74) *Attorney, Agent, or Firm* — Haynes and Boone, LLP

(57) ABSTRACT

An integrated circuit (IC) for controlling a power converter. The IC includes a controller that, in a first sensing period, enables a sensing circuit of the power converter and electrically connects an output node of an op amp of the sensing circuit and a first node of a capacitor of the sensing circuit, creating a first voltage across the capacitor; in a period between the first sensing period and a second sensing period, disables the sensing circuit and disconnects the output node of the op amp and the first node of the capacitor to maintain the first voltage across the capacitor; and in the second sensing period, enables the sensing circuit and connects the output node of the op amp and the first node of the capacitor, the maintained first voltage across the capacitor reducing a settling time for the enabled sensing circuit.

21 Claims, 8 Drawing Sheets

SYSTEMS, METHODS, AND DEVICES FOR CURRENT SENSING

TECHNICAL FIELD

The present disclosure generally relates to power conversion and control and, more particularly, to systems, methods, and devices for current sensing.

BACKGROUND

Many electronic products, particularly mobile computing and/or communication products and components (e.g., notebook computers, ultra-book computers, tablet devices, LCD and LED displays), require multiple voltage levels. For example, radio frequency transmitter power amplifiers may require relatively high voltages (e.g., 12V or more), and logic circuitry may require a low voltage level (e.g., 1-2V). Some other circuitry may require an intermediate voltage level (e.g., 5-10V). Power converters are often used to generate a lower or higher voltage from a common power source, such as a battery, in order to meet the power requirements of different components in the electronic products. Sensing circuits may be used with power converters to sense characteristics of power converter operation, which may be used to control the power converter.

SUMMARY

Embodiments of the present disclosure provide an integrated circuit (IC) for controlling a power converter. The power converter includes a sensing circuit that includes: an op amp having a first input node, a second input node connected to an output node of the sensing circuit, and an output node; a transistor having a first node connected to the output of the sensing circuit, and a control node; a capacitor having a first node connected to the control node of the transistor and a second node connected to ground; a first switch selectively connecting the first input node of the op amp to an input node of the sensing circuit; and a second switch coupled between the output node of the op amp and the first node of the capacitor. The IC includes a controller that, in a first sensing period, enables the sensing circuit and controls the second switch to electrically connect the output node of the op amp and the first node of the capacitor, creating a first voltage across the capacitor; in a period between the first sensing period and a second sensing period, disables the sensing circuit and controls the second switch to disconnect the output node of the op amp and the first node of the capacitor to maintain the first voltage across the capacitor; and in the second sensing period, enables the sensing circuit and controls the second switch to connect the output node of the op amp and the first node of the capacitor, the maintained first voltage across the capacitor reducing the settling time for the enabled sensing circuit.

Embodiments of the present disclosure also provide a power converter including: a regulator; a sensing circuit including an input node coupled to the regulator; and a controller. The sensing circuit includes: an op amp including a first input node, a second input node connected to an output node of the sensing circuit, and an output node; a transistor including a first node coupled to the output node of the sensing circuit, and a control node; a capacitor including a first node coupled to the control node of the transistor and a second node connected to ground; a first switch arranged between the input node of the sensing circuit and the first input node of the op amp; and a second switch arranged between the output node of the op amp and the first node of the capacitor. The controller is to: in a first period, output a control signal in a first state to electrically connect the input node of the sensing circuit and the first input node of the op amp via the first switch, and electrically connect the output node of the op amp and the first node of the capacitor, via the second switch; and in a second period following the first period, output the control signal in a second state to electrically connect the first input node of the op amp to a reference voltage via the first switch, and electrically isolate the output node of the op amp from the first node of the capacitor by opening the second switch to hold a voltage across the capacitor during the second period.

Embodiments of the present disclosure further provide a method for controlling a power converter that includes a sensing circuit that includes an op amp having a first input node, a second input node coupled to an output node of the sensing circuit, and an output node; a transistor having a first node coupled to the output node; a capacitor coupled between a control node of the transistor and ground; a first switch arranged between an input node of the sensing circuit and the first input node of the op amp; and a second switch arranged between the output node of the op amp and the capacitor. The method includes: in a first sensing period, enabling the sensing circuit and controlling the second switch to electrically connect the output node of the op amp and the first node of the capacitor to create a first voltage across the capacitor; and in a period between the first sensing period and a second sensing period, disabling the sensing circuit and controlling the second switch to disconnect the output node of the op amp and the first node of the capacitor to maintain the first voltage across the capacitor, so that the maintained first voltage across the capacitor reduces the settling time for the sensing circuit after the sensing circuit is enabled in the second sensing period.

Embodiments of the present disclosure further provide a sensing circuit for a power converter. The sensing circuit includes: an op amp including a first input node, a second input node connected to an output node of the sensing circuit, and an output node; a transistor including a first node coupled to the output node of the sensing circuit, and a control node; a capacitor including a first node coupled to the control node of the transistor and a second node connected to ground; a first switch arranged between an input node of the sensing circuit and the first input node of the op amp; and a second switch arranged between the output node of the op amp and the first node of the capacitor. The sensing circuit operates alternatively between a first period enabling sensing and a second period disabling sensing. During the first period, both of the first switch and the second switch are closed to form a feedback control loop for tracking an input signal of the sensing circuit to provide an output signal of the sensing circuit. During the second period, both of the first switch and the second switch are opened to cut off the feedback control loop to maintain the voltage across the capacitor.

Embodiments of the present disclosure further provide a controller for controlling a sensing circuit for a power converter. The sensing circuit includes: an op amp including a first input node, a second input node connected to an output node of the sensing circuit, and an output node; a transistor including a first node coupled to the output node of the sensing circuit, and a control node; a capacitor including a first node coupled to the control node of the transistor and a second node connected to ground; a first switch arranged between an input node of the sensing circuit and the first input node of the op amp; and a second switch arranged between the output node of the op amp and the first node of the capacitor. The controller is to control the first switch and the second switch in the sensing circuit to close a feedback control loop during the first period so that the sensing circuit provides an output voltage tracking an input voltage of the sensing circuit, and to cut off the feedback control loop to maintain a voltage across the capacitor during the second period, so that the maintained voltage across the capacitor reduces a settling time for the sensing circuit after the sensing circuit is enabled in next first period.

Embodiments of the present disclosure further provide a sensing circuit for a power converter. The sensing circuit includes: a first transistor including a first node selectively coupled to a first input sensing node of the sensing circuit, and a second node coupled to a current source; a second transistor including a first node coupled to a second input sensing node of the sensing circuit, and a control node; a capacitor including a first node coupled to the control node of the second transistor and a second node connected to ground; and a first switch arranged between the control node of the second transistor and the second node of the first transistor. During a first period, the first switch is closed to connect the control node of the second transistor to the second node of the first transistor, forming a feedforward circuit for tracking an input signal at the first input sensing node of the sensing circuit to provide a sensing signal at the second input sensing node of the sensing circuit, and creating a voltage across the capacitor. During a second period following the first period, the first switch is opened to disconnect the control node of the second transistor from the second node of the first transistor, cutting of the feedforward circuit and maintaining the voltage across the capacitor.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

BRIEF DESCRIPTION OF THE DRAWINGS

Embodiments and various aspects of the present disclosure are illustrated in the following detailed description and the accompanying figures. It is noted that, in accordance with standard practice in the industry, various features are not drawn to scale. In fact, the dimensions of the various features may be arbitrarily increased or reduced for clarity of discussion.

DETAILED DESCRIPTION

Figure 1:
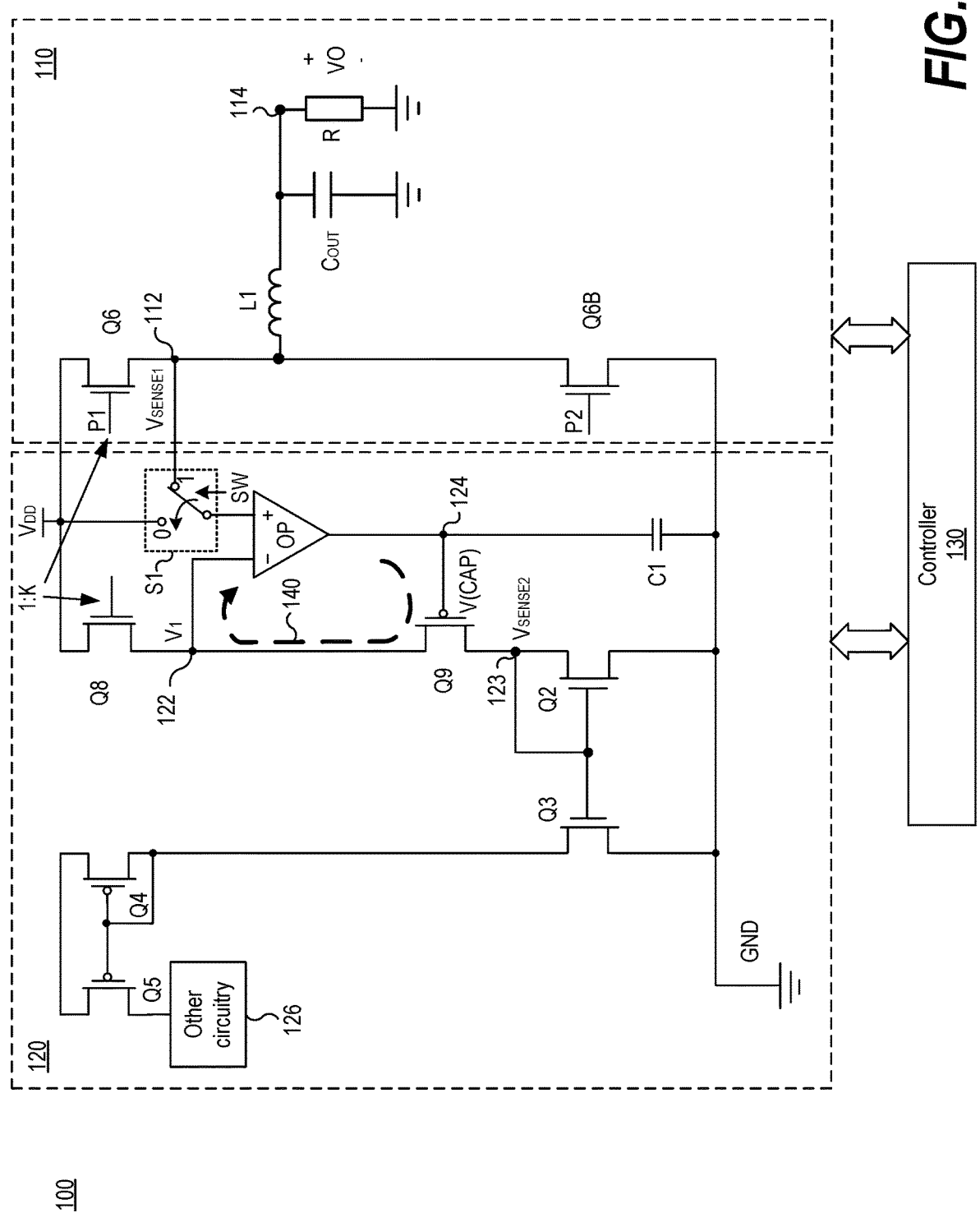
FIG. 1 is schematic diagram of a power converter according to a comparative example.

The following disclosure provides many different exemplary embodiments, or examples, for implementing different features of the provided subject matter. Specific simplified examples of components and arrangements are described below to explain the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this disclosure, the term "coupled" may also be termed as "electrically coupled," and the term "connected" may be termed as "electrically connected." "Coupled" and "connected" may also be used to indicate that two or more elements cooperate or interact with each other.

In this disclosure, the term "node" may refer to a location within an electrical circuit or system. A node may include, for example, a terminal (e.g., the terminal of a component, such as the drain terminal of a transistor), a location or region along a trace or wire, or the point at which two components are electrically coupled. While a particular location of a node may be described, to the extent that other locations have equivalent electrical properties, such locations may be used. For example, all locations along a trace that are not separated by a resistor may have the same voltage and may be considered the same node for purposes of determining voltage at that location.

Throughout this disclosure, embodiments are discussed in relation to particular electrical components, such as capacitors and inductors. Although an individual component may be discussed (e.g., a single capacitor, a single inductor), a combination of multiple components may be substituted for the single component. For example, while a single capacitor may be discussed or depicted, two or more capacitors (e.g., in series, parallel, or a combination of the two) may be substituted so long as the required qualities remain the same. In this example, an embodiment that calls for a single 20 mF capacitor may use two capacitors of 10 mF in parallel instead. Similar substitutions may be made for inductors.

Various embodiments of the present disclosure will be described with respect to embodiments in a specific example context, such as a sensing circuit for a power converter. As used in this disclosure, the term "power converter" may refer to a converter configured to convert an input voltage to an output voltage. The term "sensing circuit" may refer to a circuit configured to sense a voltage at a node within the power converter, and output a sensed voltage at an output node. Alternatively, the term "sensing circuit" may refer to a circuit configured to sense a current flowing through a node within the power converter, and output a sensed current at an output node.

A switching power converter, such as a buck converter or a boost converter, generally operates in a switching mode that switches between two circuit configurations in different states (e.g., an "on" state and an "off" state) by controlling one or more switching elements to achieve a DC-to-DC power conversion. For example, a buck converter, in the "on" state, may receive an input voltage from an input node of the power converter to charge an inductor within the power converter. In the "off" state, the buck converter may be disconnected from the input voltage source and discharge the energy stored in the inductor to maintain the output voltage.

Power converters may include sensing circuitry for, among other things, controlling their operation to achieve a desired output. The load on a power converter may change over time, and the power converter may need to adjust its operation to maintain the desired voltage. Sensing circuitry may monitor the current and/or voltage at various nodes within the converter to ensure that the desired voltage and/or current is supplied to the load. Sensing circuitry, however, may include certain delays in determining the voltage and/or current. For example, a sensing circuit may include a certain amount of settling time between when the sensing circuit is activated and when it is able to accurately provide the sensed voltage due to the particular design of the sensing circuitry. Certain power converters, however, may operate at switching frequencies high enough that the period of a particular switched state is less than the settling time of the sensing circuitry. As a result, the sensing circuitry may not be able to accurately provide the sensed voltage and/or current, which can create issues for accurately controlling the power converter. Disclosed embodiments may address this issue by providing sensing circuitry that may include a shorter settling time.

As one example of sensing circuitry, a power converter may include current mirror circuitry to "duplicate" the current supplied by the power converter at a given point in time. Some current mirror circuits may employ an operational amplifier ("op amp") to form a feedback-assisted current mirror. The sensing circuit may utilize a feedback control loop to represent an external signal (voltage or current) as an input signal (voltage or current). The feedback control loop may include a speed-limiting circuit node connected to a capacitor. For example, the capacitor may limit the sensing circuits response time because it takes time to reach a charging voltage that matches the supplied potential. When the power converter operates with high switching frequency or low duty cycle that results a shorter pulse active time ("on time") in a period, the sensing circuit has less time to reach the desired voltage level. As a result, the capacitor's charging voltage may not reach the supplied voltage within the time period available for sensing. When the capacitor's settling time is greater than the time window for a given sensing sample, sensing errors may therefore occur.

Disclosed embodiments may address challenges with the design of the sensing circuit the power converter. In embodiments, the sampling circuitry may utilize a sample-and-hold technique to reduce the settling time. In the context of a current mirror, the sampling circuitry may include a feedback control loop that is only closed when the sensing circuit is operated in a sensing period that senses the current or voltage at the input node. When the sensing is discontinued, the feedback control loop may be open such as through the addition of one or more switches between the op amp output and the capacitor. As a result, until the next sensing period starts and during the non-sensing period, the capacitor connected to the speed-limiting circuit node stores and holds the voltage value at the end of the sensing period. When the next sensing period starts and the sensing resumes, the voltage therefore adjusts from the previous storage voltage, as opposed to zero volts. Because this decreases the differential between the voltage to be sampled and the charge state of the sampling circuit, the settling time for the capacitor may decrease. Therefore, the time to drive the output signal close or equal to the desired value may be significantly reduced.

Description of the embodiments of the present disclosure will be provided in detail below with references to the accompanying drawings. Wherever possible, the same reference numbers will be used throughout the drawings to refer to the same or like parts.

FIG. 1 is schematic diagram of a power converter 100 according to a comparative example. Power converter 100 may include a regulator 110 configured to generate an output voltage VO at a node 114 from an input voltage, a sensing circuit 120 configured to sense a current flowing through a first input sensing node 112) of regulator 110 (e.g., input sensing signal $V_{SENSE1}$), and a controller 130 configured to control regulator 110 and sensing circuit 120. For example, the input voltage (e.g., the voltage across a high-side switch Q6) may be less than 20 mV (e.g., when the high-side switch Q6 is enhanced).

In the embodiment illustrated in FIG. 1, regulator 110 may be implemented as a buck converter. Alternatively, in other embodiments, regulator 110 may be implemented as other switched-inductor circuits, such as a boost converter, or a buck-boost converter.

Regulator 110 may include the high-side switch Q6, a low-side switch Q6B, an inductor L1, an output capacitor $C_{OUT}$, and a resistor R. High-side switch Q6 and low-side switch Q6B may be coupled in series with node 112 disposed therebetween. A first node of inductor L1 may be coupled to node 112. A second node of inductor L1 may be coupled to output capacitor $C_{OUT}$ and load R to provide output voltage VO at node 114.

During operation of regulator 110, high-side switch Q6 and low-side switch Q6B open and close (i.e., present high and low impedance, respectively) in alternating states. The open and closed states of high-side switch Q6 and low-side switch Q6B may be controlled by a first switching signal P1 and a second switching signal P2 supplied from controller 130. First switching signal P1 and second switching signal P2 may be generally non-overlapping and complementary switching signals. As a result, when high-side switch Q6 is open, low-side switch Q6B is closed; and when high-side switch Q6 is closed, low-side switch Q6B is open. By adjusting duty cycles of the switching signals P1 and P2, high-side switch Q6 and low-side switch Q6B may operate at a switching frequency and achieve pulse width modulation (PWM) control to regulate output voltage VO at a desired level.

In the example illustrated in FIG. 1, both of high-side switch Q6 and low-side switch Q6B may be implemented as N-channel metal-oxide-semiconductor field-effect transistors (N-MOSFETs). The open or closed state of high-side switch Q6 may be controlled by first switching signal P1 applied by controller 130 to the gate node of high-side switch Q6. The open or closed state of low-side switch Q6B may be controlled by second switching signal P2 applied by controller 130 to the gate node of low-side switch Q6B.

Sensing circuit 120 may be coupled to first input sensing node 112 between high-side switch Q6 and low-side switch Q6B, and may be configured to sense a current flowing through first input sensing node 112 when high-side switch Q6 is closed and low-side switch Q6B is open, and may generate an internal sensing signal (e.g., Vi) at node 122 of sensing circuit 120, which in turn generates a second sensing signal (e.g., $V_{SENSE2}$) at node 123. Hereinafter, node 112 is referred to as "first input sensing node 112" of sensing circuit 120, node 122 is referred to as "first internal node 122" of sensing circuit 120, and node 123 is referred to as "second input sensing node 123" of sensing circuit 120. Sensing circuit 120 may include transistors Q2, Q3, Q4, Q5, Q8, and Q9, an operational amplifier (hereinafter referred to as "op amp") OP, a first switch S1, a capacitor C1, and other circuitry 126.

In the example illustrated in FIG. 1, transistors Q2, Q3, and Q8 may be implemented as N-MOSFETs, and transistors Q4, Q5, and Q9 may be implemented as P-channel MOSFETs (P-MOSFETs), but the present disclosure is not limited thereto. Transistor Q8 and high-side switch Q6 may be connected to each other to function as a current mirror. A ratio between the factors of transistors Q8 and Q6 may be 1:K (where K is a number equal to or greater than 1) such that, when both of transistors Q8 and Q6 are conducting and a current flowing through high-side switch Q6 is $I_{IN}$, a current flowing through transistor Q8 is $I_{IN/k}$. The current $I_{IN/k}$ flowing through transistor Q8 may be used as the sensor output signal to be output into controller 130 to control the operation of power converter 100. The node shared by Q8 and Q6 may be at a voltage equivalent to the supply voltage (Vdd).

Transistors Q2 and Q3 may be connected to function as a current mirror that copies a current flowing through transistor Q2 by controlling a current flowing through transistor Q3. Transistors Q4 and Q5 may be connected to function as a current mirror that copies a current flowing through transistor Q4 by controlling a current flowing through transistor Q5 to other circuitry 126.

Transistor Q9 may be connected between first internal node 122 and second sensing node 123. A gate node of transistor Q9 may be connected to a second internal node 124 of sensing circuit 120. Capacitor C1 may be coupled between second internal node 124 and ground.

Op amp OP may have a first input node connected to first switch S1, a second input node connected to first internal node 122 of sensing circuit 120, and an output node connected to second internal node 124. In the example illustrated in FIG. 1, the first input of op amp OP is a noninverting input (labeled as "+"), and the second input of op amp OP is an inverting input (labeled as "−").

First switch S1 may be a single-pole, double throw switch having an input connected to the first input node of op amp OP, a first output connected to node 112, and a second output connected to the drain node of high-side switch Q6. First switch S1 may be controlled by a control signal SW supplied from controller 130 to switch between two switching positions "1" and "0". When first switch S1 is at position "1" (e.g., during a sensing period), first switch S1 connects its input with its first output, thereby connecting the first input node of op amp OP with first input sensing node 112. As a result, sensing circuit 120 senses a current flowing through high-side switch Q6. When first switch S1 is at position "0" (e.g., during a non-sensing period), first switch S1 connects its input with its second output, thereby connecting the first input node of op amp OP with the drain node of high-side switch Q6. As a result, sensing circuit 120 does not sense the current flowing through high-side switch Q6. Hereinafter, the period when sensing circuit 120 senses the current is referred to as a sensing period or a first period, and the period when sensing circuit 120 does not sense the current is referred to as a non-sensing period of a second period.

The control signal SW for controlling first switch S1 substantially overlaps with first switching signal P1 applied to the gate node of high-side switch Q6, such that when high-side switch Q6 is turned on (i.e., conducting), sensing circuit 120 senses the current flowing through high-side switch Q6 and the inductor L1.

In the example of FIG. 1, sensing circuit 120 forms a feedback control loop 140 coupled between the output node and the second input node of op amp OP. The feedback control loop 140 is continuously closed, during the sensing period and non-sensing period. Accordingly, in both sensing and non-sensing periods, the voltage V(CAP) at second internal node 124 (e.g., the voltage across capacitor C1) depends on the signal received at the noninverting input of the op amp OP.

Figure 2:
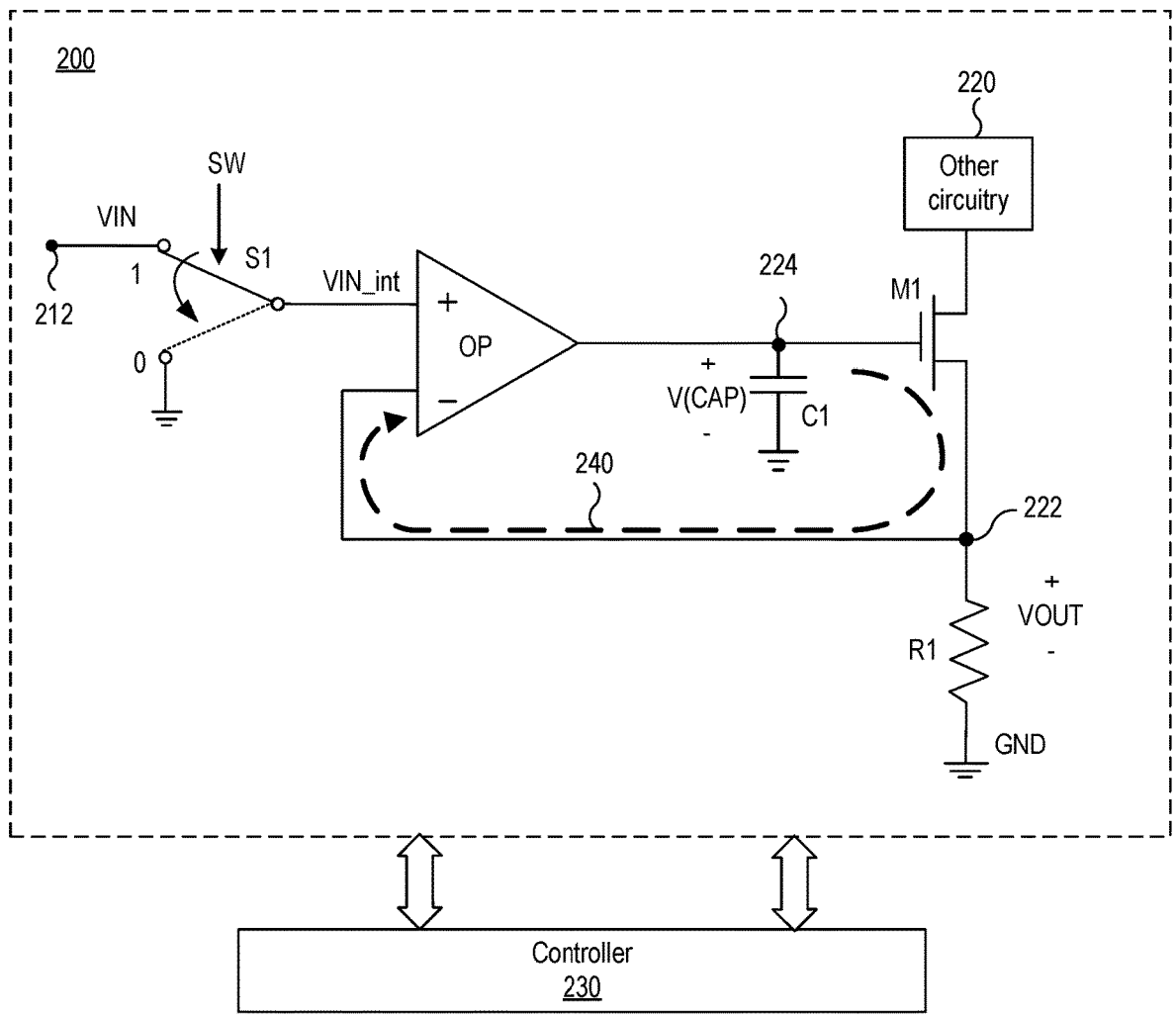
FIG. 2 is schematic diagram of a sensing circuit according to a comparative example.

FIG. 2 is schematic diagram of a sensing circuit 200, which is a simplified conceptual view of sensing circuit 120 illustrated in FIG. 1, according to a comparative example. As illustrated in FIG. 2, sensing circuit 200 may include an op amp OP, a capacitor C1, a first switch S1, a transistor M1, and a first resistor R1. Sensing circuit 200 may be controlled by controller 230, and may be configured to sense a voltage VIN at input node 212 and output a sensing voltage VOUT at output node 222. For example, input voltage VIN at input node 212 may be less than 20 mV.

Op amp OP may include a first input node (non-inverting node labeled as "+") connected to first switch S1, a second input node (inverting node labeled as "—") connected to output node 222 of sensing circuit 200, and an output node connected to an internal node 224.

Capacitor C1 may be coupled between internal node 224 and the ground. Transistor M1 may have a first source/drain (S/D) node connected to other circuitry 220, a second source/drain (S/D) node connected to output node 222, and a gate node connected to internal node 224. First resistor R1 may be coupled between output node 222 and ground.

First switch S1 may be a single-pole, double throw switch, including an input connected to the first input node of op amp OP, a first output connected to input node 212, and a second output connected to ground. First switch S1 may be controlled by a control signal SW supplied from controller 230 to switch between two switching positions "1" and "0". When first switch S1 is at position "1", the first input node of operational amplifier OP is connected to input node 212 to receive an internal input voltage VIN_int. When first switch S1 is at position "0", the first input node of op amp OP is connected to ground.

As shown in FIG. 2, when first switch S1 is at position "1" (e.g., during the sensing period), first switch S1, op amp OP, and transistor M1, collectively form a voltage follower circuit. Particularly, by a feedback control loop 240 coupled between the output node (e.g., internal node 224) and the second input node (e.g., inverting input node) of op amp OP, during the sensing period, capacitor C1 is gradually charged and the capacitor voltage V(CAP) increases to a corresponding level to provide the output voltage VOUT tracking (e.g., being equal to) the input voltage VIN at the steady state. Similarly, during the non-sensing period, by feedback control loop 240, the capacitor voltage V(CAP) is dropped to zero and the output voltage VOUT is equal to zero.

Figure 3:
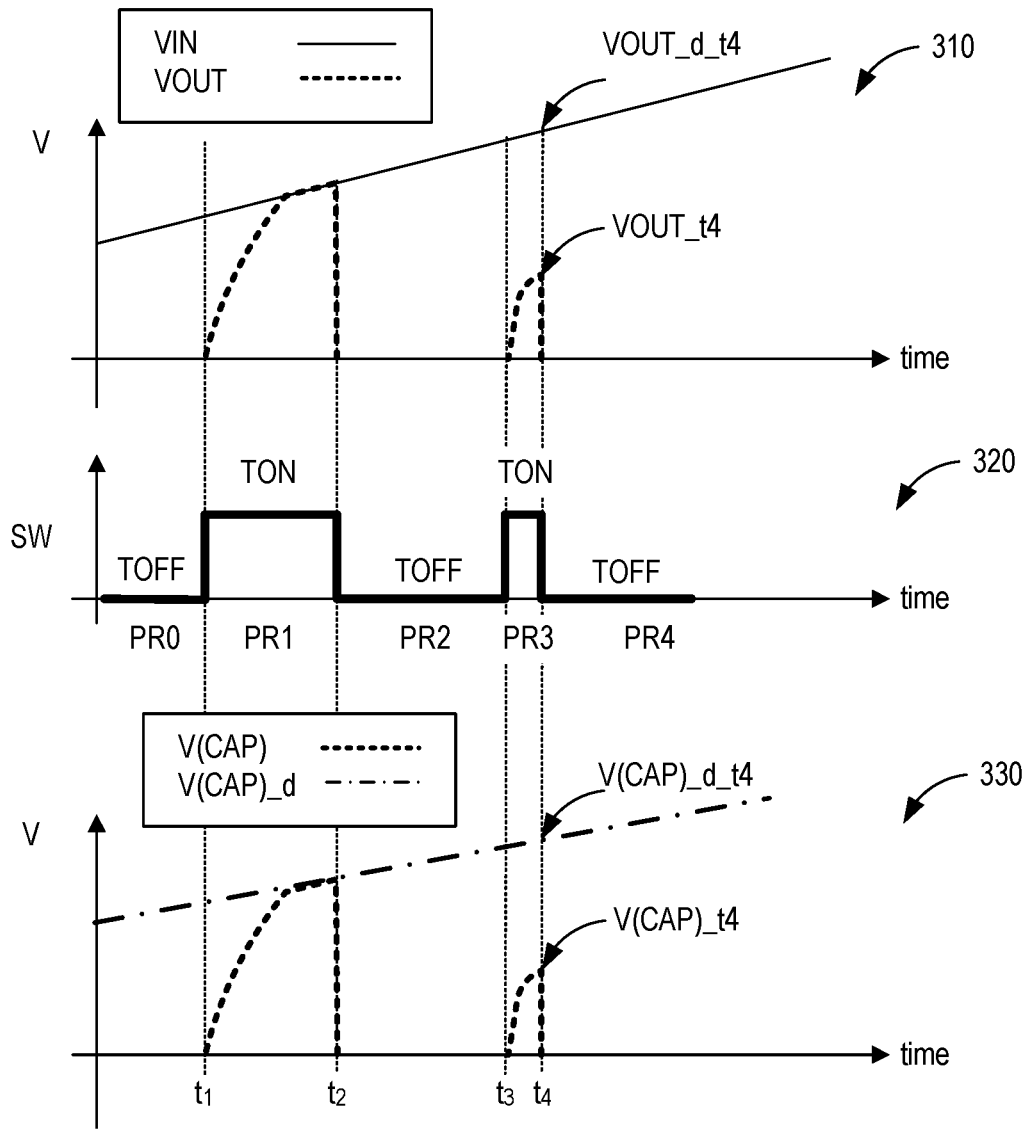
FIG. 3 are graphs of waveforms of various voltages of the sensing circuit illustrated in FIG. 2, according to a comparative example.

FIG. 3 includes graphs of waveforms of various voltages of sensing circuit 200 illustrated in FIG. 2, according to a comparative example. As shown, voltage and control signals are plotted as a continuous time-dependent series.

In FIG. 3, graph 310 illustrates a waveform of input voltage VIN at input node 212 over time, and a waveform of output voltage VOUT at output node 222 over time.

Graph 320 shows the waveform of a control signal SW outputted by controller 230 for controlling first switch S1. As shown in FIG. 3, the control signal SW switches between a logical low level indicates an "off" state and a logical high level indicates an "on" state. In some embodiments, the control signal SW may be in one "on" state for less than 20 nanoseconds. For ease of reference, the label of "TON" indicates the control signal SW is in an "on" state. In the TON periods (e.g., periods PR1 and PR3), controller 230 may control first switch S1 to be at position "1". This control scheme may cause sensing circuit 200 to operate in a sensing period. "TOFF" may represent the control signal SW in an "off" state. In the TOFF periods (e.g., periods PR0, PR2, and PR4), controller 230 may control first switch S1 to be at position "0". During the TOFF periods PR0, PR2, and PR4, with the internal input voltage VIN_int being connected to the ground, sensing circuit 200 operates in a non-sensing period, in which the sensing is disabled.

Graph 330 shows a waveform of voltage V(CAP) at internal node 224 over time, and a waveform of a desired voltage V(CAP)_desired over time. In the example illustrated in FIG. 3, input voltage VIN gradually increases over time. Ideally, when first switch S1 is continuously placed at position "1", the first input node of op amp OP is continuously connected to input node 212 to receive internal input voltage VIN_int. Thus, voltage V(CAP) at internal node 224 tracks the changes of input voltage VIN, as indicated by V(CAP)_d in graph 330 of FIG. 3. Although not shown, VIN may not necessarily gradually increase over time. In some embodiments, it may decrease over time or alternately decrease and increase, such as changing over time with no particular pattern.

As shown in FIG. 3, at time t1, the control signal SW is switched to the "on" state. In response to the control signal SW switching to the "on" state, first switch S1 is switched from position "0" to position "1". As a result, the first input node of op amp OP is connected to input node 212 to receive internal input voltage VIN_int. Thus, sensing circuit 200 operates in a sensing period to sense input voltage VIN. Voltage V(CAP) at node 224 gradually rises from a lower voltage until settling to desired voltage V(CAP)_d. Output voltage VOUT also rises from a lower voltage until settling to input voltage VIN.

At time t2, the control signal SW is switched to the "off" state. In response, first switch S1 is switched from position "1" to position "0". As a result, the first input node of op amp OP is connected to ground. Thus, sensing circuit 200 operates in a non-sensing period. Accordingly, both of voltage V(CAP) and output voltage VOUT drop to their respective lower voltages (e.g., ground).

At time t3, the control signal SW is switched to the "on" state. In response, first switch S1 is switched from position "0" to position "1" again. As a result, the first input node of op amp OP is connected to input node 212 to receive internal input voltage VIN_int. Thus, sensing circuit 200 operates in a sensing period PR3 to sense input voltage VIN. During sensing period PR3, voltage V(CAP) gradually rises toward the desired voltage V(CAP)_d as capacitor C1 is being charged.

At time t4, voltage V(CAP) rises to V(CAP)_t4 instead of the desired voltage V(CAP)_d_t4, and VOUT rises to VOUT_t4 instead of the desired output voltage VOUT_d_t4. At this time, the control signal SW is switched to the "off" state. In response, first switch S1 is switched from position "1" to position "0". As a result, both of voltage V(CAP) and output voltage VOUT drop to their respective lower voltages, without reaching their respective desired voltages during the sensing period PR3.

When the power converter operates with high switching frequency or low duty cycle that results a shorter pulse active time ("on time"), the sensing period (e.g., period PR3) is relatively short, and thus voltage V(CAP) does not have adequate time to reach the desired voltage level V(CAP)_d. Accordingly, sensing errors may occur when power converter 100 operates with a short on time period if the sensing circuit requires a lengthy response time.

Thus, the response time of sensing by sensing circuit 200 is limited by the transient response time of feedback control loop 240. The longer the transient period for V(CAP) to settle into the desired voltage level voltage V(CAP)_d, the longer the time required for proper sensing by sensing circuit 200, hence the longer the time required for high-side switch Q6 to remain in the on position. When the power converter operates with a short on time, potential incorrect sensing results due the lengthy sensing response time may cause the power converter to malfunction. For example, the control circuitry may attempt to adjust the operation of the converter on an incorrect understanding of the current and/or voltage. The control circuitry therefore may make adjustments that are inconsistent with (and potentially contrary to) the actual instantaneous operating parameters of the power converter.

In order to overcome the above-described problem, embodiments of the present disclosure may provide a control scheme which may open a feedback control loop of a sensing circuit during a non-sensing period, thereby holding the voltage level at a speed limiting node at the previous sensing period. Thus, when the sensing circuit operates in a subsequent sensing period, the voltage level at the speed limiting node can change and/or settle in a new state from the previously held voltage level, thereby reducing the transient time of the feedback control loop.

Figure 4:
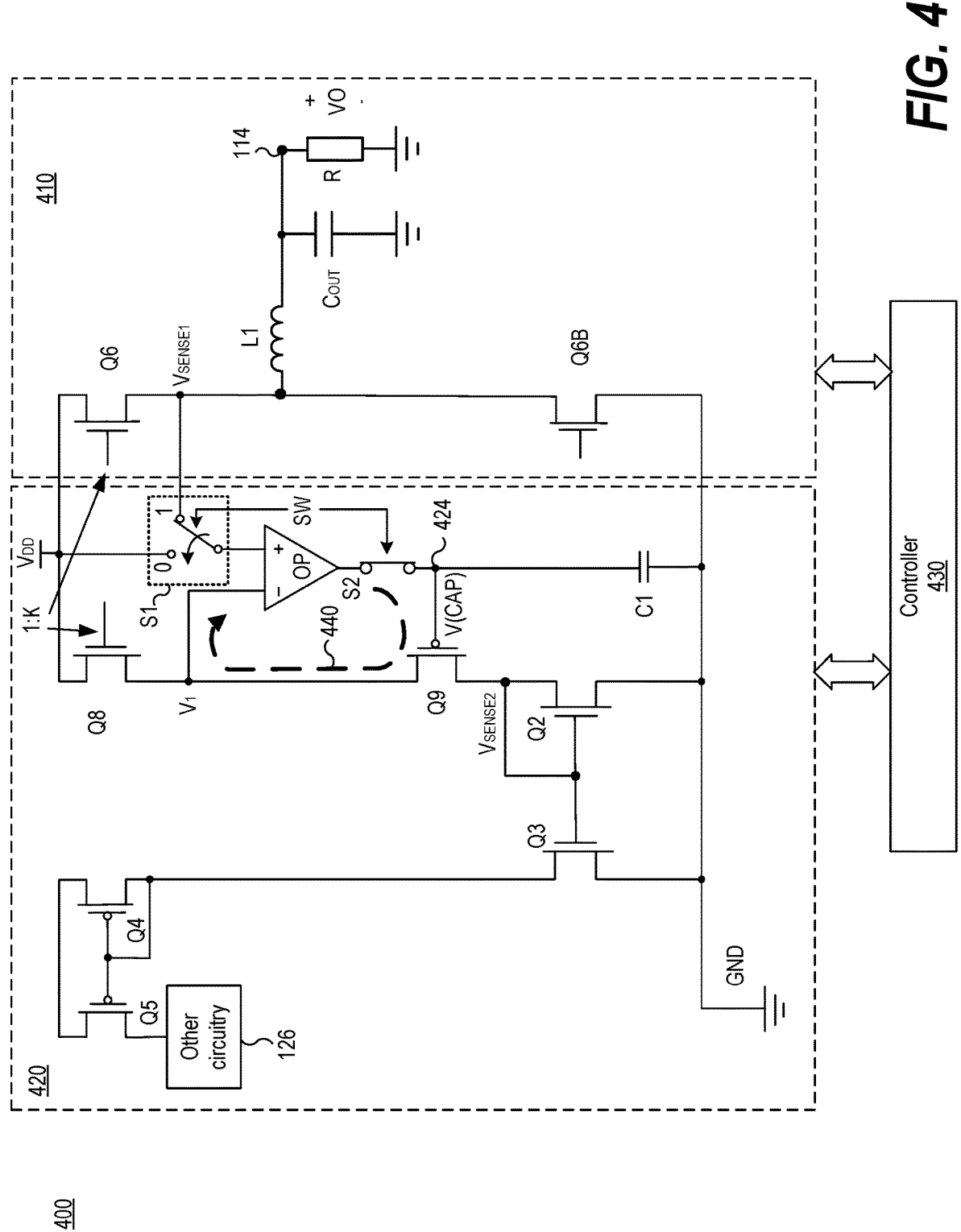
FIG. 4 is schematic diagram of a power converter according to embodiments of the present disclosure.

FIG. 4 is schematic diagram of a power converter 400 according to embodiments of the present disclosure. Power converter 400 may include a regulator 410, a sensing circuit 420, and a controller 430 for controlling regulator 410 and sensing circuit 420. One difference between power converter 400 of the embodiments of the present disclosure and power converter 100 of the comparative example in FIG. 1 is that sensing circuit 420 of power converter 400 includes a second switch S2 connected between the output node of op amp OP and internal node 424 to which capacitor C1 and transistor Q9 are coupled.

Specifically, as illustrated in FIG. 4, second switch S2 may be a single-pole, single throw switch including a first node connected to the output node of op amp OP, and a second node connected to internal node 424. When second switch S2 is in a closed state, the output node of op amp OP is connected to node 424 via second switch S2. Accordingly, feedback control loop 440 is closed. When second switch S2 is in an open state, the output node of op amp OP is disconnected from node 424. By breaking the connection between the output node of op amp OP and internal node 424, feedback control loop 440 is open. In some embodiments, controller 430 may use the same control signal SW to control second switch S2 and first switch S1, such that when first switch S1 is at position "1", second switch S2 is closed; and when first switch S1 is at position "0", second switch S2 is open. As a result, during the sensing period, when sensing circuit 420 senses the current flowing through high-side switch Q6, feedback control loop 440 is closed, and the first node of capacitor C1 is connected to the output node of op amp OP. In the non-sensing period, feedback control loop 440 is open, and the first node of capacitor C1 is disconnected from the output node of op amp OP.

In some alternative embodiments, capacitor C1 may be coupled between internal node 424 and VDD, instead of between internal node 424 and ground GND. Such configuration may be advantageous for current sense signal tracking. Still, in some alternative embodiments, if the parasitic gate capacitance of transistor Q9 is large enough to hold the sensing signal, it may be unnecessary to include capacitor C1 in sensing circuit 420. In other words, capacitor C1 may be either a discrete capacitor or a parasitic capacitor.

Various components of power converter 400 are similar to, or substantially the same as, those of power converter 100 illustrated in FIG. 1. Therefore, detailed descriptions of the components of power converter 400 and the connections therebetween are not repeated herein for the sake of brevity.

Figure 5:
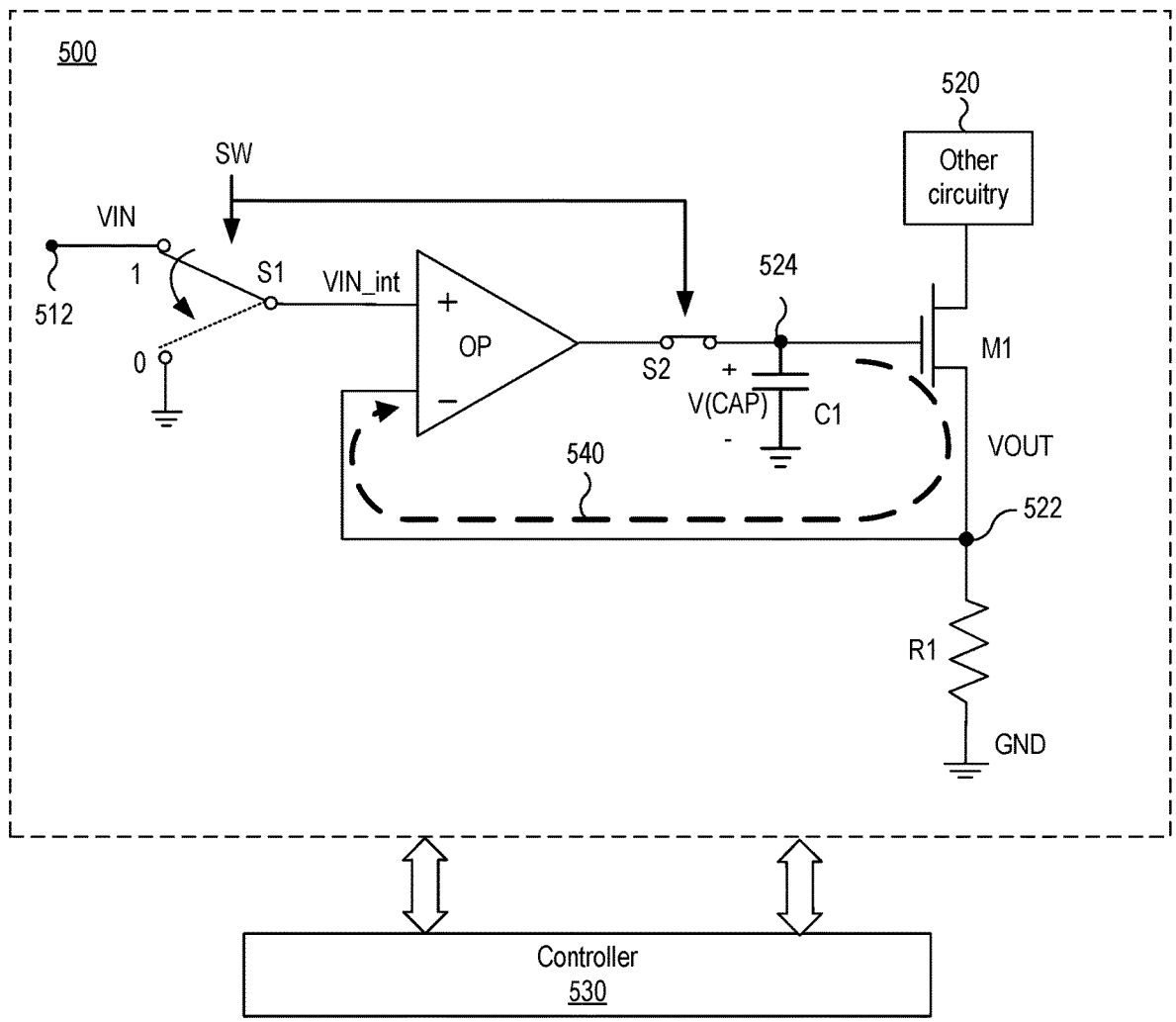
FIG. 5 is schematic diagram of a sensing circuit according to embodiments of the present disclosure.

FIG. 5 is schematic diagram of a sensing circuit 500, which is a simplified circuit of sensing circuit 420 illustrated in FIG. 4, according to embodiments of the present disclosure. Similar to sensing circuit 200 of the embodiment of the present disclosure, sensing circuit 500 may be controlled by a controller 530 to sense an input voltage VIN at an input node 512 and output an output voltage VOUT at an output node 522. Compared to sensing circuit 200 in FIG. 2, sensing circuit 500 includes second switch S2 arranged between the output node of op amp OP and the node 524 and configured to selectively connect or disconnect the op amp OP to the capacitor C1 and transistor M1, in response to control signal SW.

Specifically, as illustrated in FIG. 5, second switch S2 may be a single-pole, single throw switch, which may include a first node connected to the output node of op amp OP, and a second node connected to internal node 524, which may be connected to capacitor C1. Controller 530 may supply control signal SW to control second switch S2 to open or close at the same time with the switching of first switch S1. Thus, when first switch S1 is at position "1" (sensing period), second switch S2 is closed, a feedback control loop 540 between the output node and the second input node of op amp OP is closed, and sensing circuit 500 senses the current at input node 212 and output the sensing result at output node 522. When first switch S1 is at position "0" (non-sensing period), the second switch S2 is open, internal node 524 is disconnected from the output node of op amp OP, and feedback control loop 540 is open. Therefore, the voltage level at internal node 524 does not change significantly and is held at the present level.

As shown in FIG. 5, when the first switch S1 is at position "1" (sensing period) and the second switch S2 is closed, the switches S1 and S2, the op amp OP, the transistor M1, collectively form a voltage follower circuit, in which the input voltage Vin and the output voltage Vout should be equal in the steady state. Various components of sensing circuit 500 are similar to, or substantially the same as, those of sensing circuit 200 illustrated in FIG. 2. Therefore, detailed descriptions of the components of sensing circuit 500 and the connections therebetween are not repeated herein for the sake of brevity.

Figure 6:
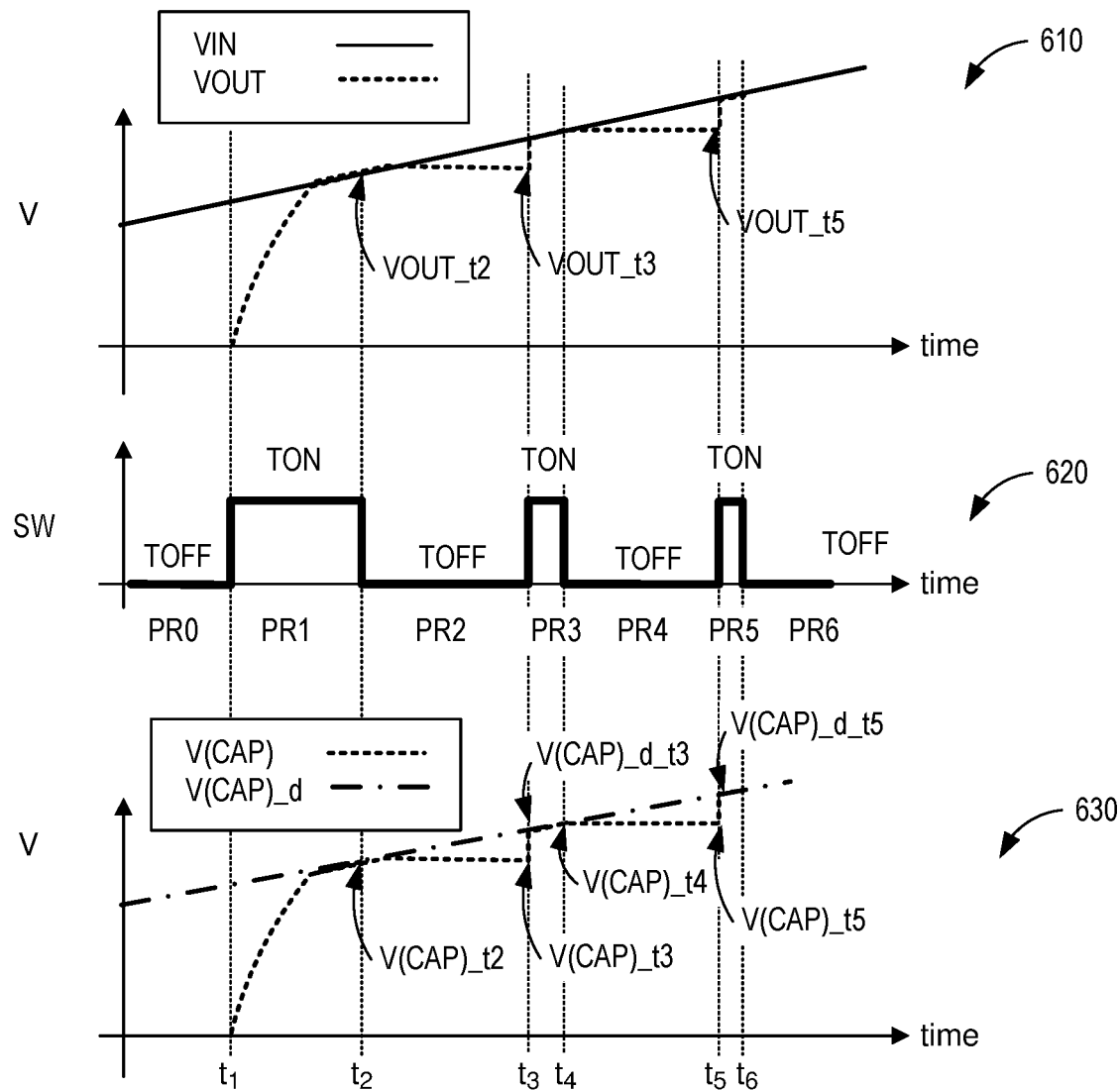
FIG. 6 are graphs of waveforms of various voltages of the sensing circuit illustrated in FIG. 6, according to embodiments of the present disclosure.

FIG. 6 includes graphs of waveforms of various voltages of sensing circuit 500 illustrated in FIG. 5, according to embodiments of the present disclosure. Similar to FIG. 3, graph 610 illustrates a waveform of input voltage VIN at input node 512 over time, and a waveform of output voltage VOUT at output node 522 over time. Graph 620 shows the waveform of a control signal SW outputted by controller 530 for controlling first switch S1 and second switch S2. The control signal SW switches between a logical low level indicates an "off" state and a logical high level indicates an "on" state. Graph 630 shows a waveform of voltage V(CAP) at internal node 524 over time, and a waveform of a desired voltage V(CAP)_d at internal node 524 over time.

As shown in FIG. 6, at time t1, the control signal SW is switched to the "on" state. In response, first switch S1 is switched from position "0" to position "1" and second switch S2 is closed. As a result, the first input node of op amp OP is connected to input node 512 to receive input voltage VIN, and the first node of capacitor C1 is connected to the output node of the op amp OP. Thus, sensing circuit 500 operates in a sensing period to sense input voltage VIN. As shown in graph 630, voltage V(CAP) at node 524 gradually rises from a lower voltage until settling to desired voltage V(CAP)_d. As shown in graph 610, output voltage VOUT also rises from a lower voltage until settling to input voltage VIN, and tracks input voltage VIN accordingly.

At time t2, the control signal SW is switched to the "off" state. In response, first switch S1 is switched from position "1" to position "0" and second switch S2 is open. As a result, the first input node of op amp OP is connected to ground, and the first node of capacitor C1 is disconnected from the output node of the op amp OP. Thus, sensing circuit 500 operates in a non-sensing period PR2. Accordingly, during the non-sensing period PR2, voltage V(CAP) at node 524 is held at approximately the same level as that of voltage V(CAP) before second switch S2 is open at time t2 (labeled as "V(CAP)_t2"). Also, as shown in graph 610, during the non-sensing period PR2, output voltage VOUT is held at approximately the same level as that of VOUT before second switch S2 is open at time t2 (labeled as "VOUT_t2").

At time t3, the control signal SW is switched to the "on" state. In response, first switch S1 is switched from position "0" to position "1" and second switch S2 is closed. As a result, sensing circuit 500 operates in a sensing period PR3. As shown in graph 630, because the voltage difference between the voltage V(CAP)_t3 at time t3 and the new desired voltage V(CAP)_d_t3 at time t3 is smaller than the voltage difference between ground and desired voltage V(CAP)_d_t3 at time t3, it takes less response time for voltage V(CAP) to quickly settle from voltage V(CAP)_t3 at time t3 into desired voltage V(CAP)_d in sensing period P3. As shown in graph 610, output voltage VOUT can also quickly settle from the output voltage VOUT_t3 at time t3 to input voltage VIN in sensing period P3. Thus, the sensing response time of sensing circuit 500 in sensing period P3 in FIG. 6 is relatively short compared to the sensing response time required for sensing circuit 200 in sensing period P3 shown in FIG. 3.

At time t4, the control signal SW is switched to the "off" state. In response, first switch S1 is switched from position "1" to position "0" and second switch S2 is open. As a result, sensing circuit 500 operates in a non-sensing period PR4. Accordingly, during the non-sensing period PR4, voltage V(CAP) at node 524 is held at approximately the same level as that of voltage V(CAP) at time t4 (e.g., V(CAP)_t4), and output voltage VOUT is held at approximately the same level as that of output voltage at time t4 (e.g., VOUT_t4).

At time t5, the control signal SW is switched to the "on" state. In response, first switch S1 is switched from position "0" to position "1" and second switch S2 is closed. As a result, sensing circuit 500 operates in a sensing period PR5. Because the voltage difference between the stored voltage V(CAP)_t5 at time t5 and the new desired voltage V(CAP)_d_t5 at time t5 is smaller than the voltage difference between ground and desired voltage V(CAP)_d_t5 at time t5, voltage V(CAP) quickly settles from voltage V(CAP)_t5 at time t5 into desired voltage V(CAP)_d in sensing period PR5. Output voltage VOUT can also quickly settle from output voltage at VOUT_t5 into input voltage VIN in sensing period P5. The sensing response time of sensing circuit 500 during sensing period PR5 is relatively short.

At time t6, the control signal SW is switched to the "off" state. In response, first switch S1 is switched from position "1" to position "0" and second switch S2 is open. As a result, sensing circuit 500 operates in a non-sensing period PR6. Accordingly, voltage V(CAP) at node 524 is held at approximately the same level as that of voltage V(CAP)_t6 at time t6, and output voltage VOUT is held at approximately the same level as that of output voltage VOUT_t6 at time t6.

As described above, in sensing circuit 500 according to the embodiment of the present disclosure, second switch S2 is connected between the output node of op amp OP and node 224, and second switch S2 is open in the non-sensing period. Thus, voltage V(CAP) is held at approximately the same level as that of voltage V(CAP) during the preceding sensing period. Then, in the subsequent sensing period, because the voltage difference between the stored voltage V(CAP) and the new desired voltage V(CAP)_d is relatively small, voltage V(CAP) is able to quickly settle into desired voltage V(CAP)_d. Similarly, output voltage VOUT also quickly settles, from the voltage level held during the non-sensing period, into input voltage VIN. Thus, the required minimum sensing time of sensing circuit 500 is significantly reduced compared to sensing circuit 200.

Figure 7:
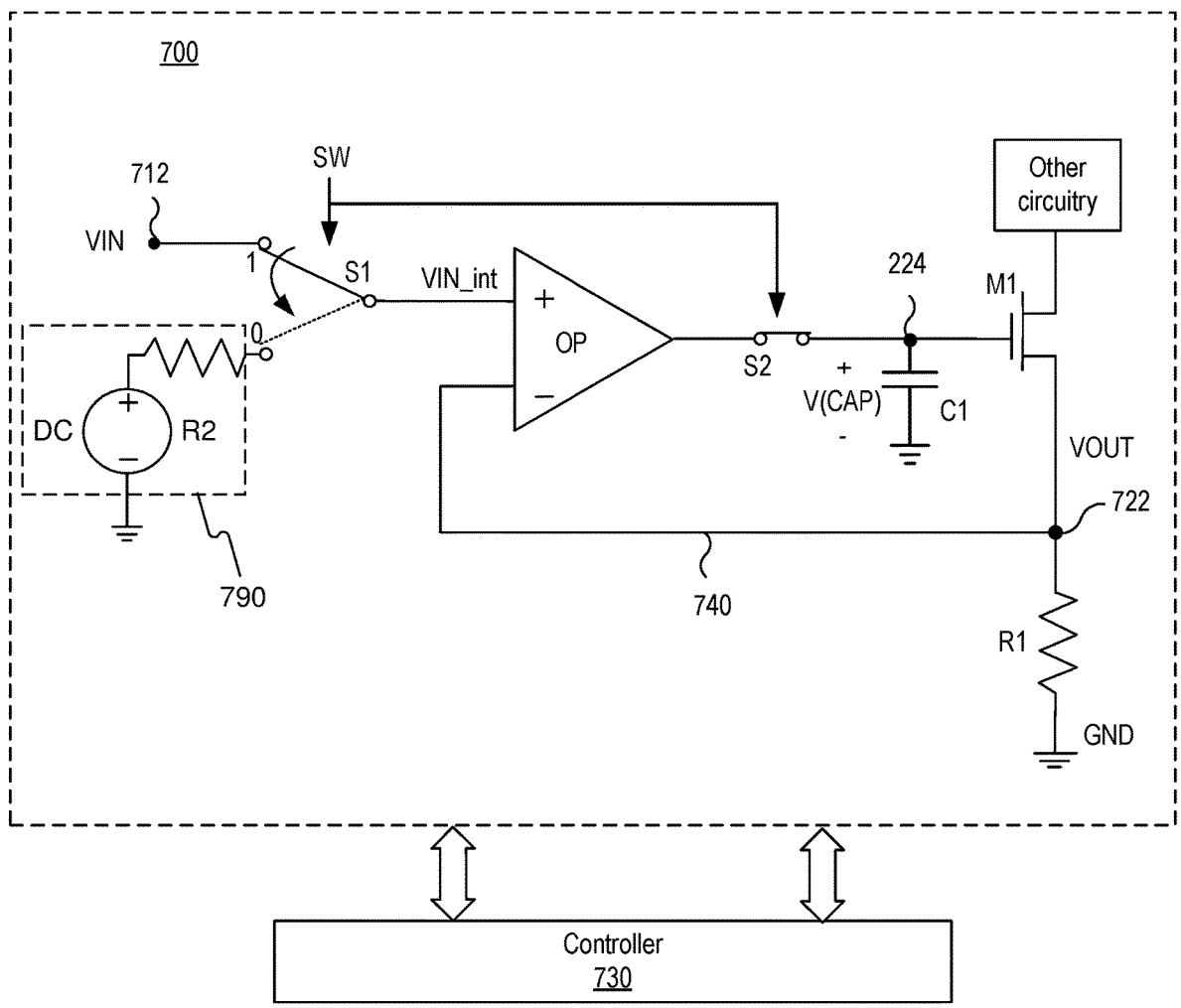
FIG. 7 is schematic diagram of a sensing circuit, according to embodiments of the present disclosure.

FIG. 7 is schematic diagram of a sensing circuit 700 according to embodiments of the present disclosure. Similar to sensing circuit 500, sensing circuit 700 may be controlled by controller 730 to sense an input voltage VIN at an input node 712 and output an output voltage VOUT at an output node 722. Compared to sensing circuit 500 of FIG. 5, sensing circuit 700 in FIG. 7 may include a pre-biasing circuit 790. Various components of sensing circuit 700 are similar to, or substantially the same, as those of sensing circuit 500 illustrated in FIG. 5. Therefore, detailed descriptions of the components of sensing circuit 700 and the connections therebetween are not repeated herein for the sake of brevity.

As illustrated in FIG. 7, pre-biasing circuit 790 may be connected to the second output (labeled as "0") of first switch S1. In some embodiments, pre-biasing circuit 790 may include a voltage source DC and a second resistor R2. The DC voltage source may be connected between ground and a first node of second resistor R2. A second node of second resistor R2 may be connected to the second output of first switch S1.

For example, input voltage VIN at node 712 may be less than 20 mV. In operation, during the non-sensing period, first switch S1 may be at position "0" and second switch S2 may be open, the DC voltage source may be configured to supply a pre-biasing voltage of, e.g., 5 mV to 10 mV, and thus internal input voltage VIN_int applied at the first input node of op amp OP may be similar or approximately equal to VIN. Thus, sensing circuit 700 may be "pre-biased" during the non-sensing period. During the sensing period, first switch S1 may be switched to position "1" and second switch S2 may be closed. Then, because the voltage at the first input node of op amp OP is pre-biased on the voltage VIN_int, it takes less time for sensing loop 740 to converge to the final operation point. In some embodiments, controller 730 may determine the pre-biasing voltage to be supplied by the voltage source DC when determining the appropriate control signals for controlling the regulator.

Figure 8:
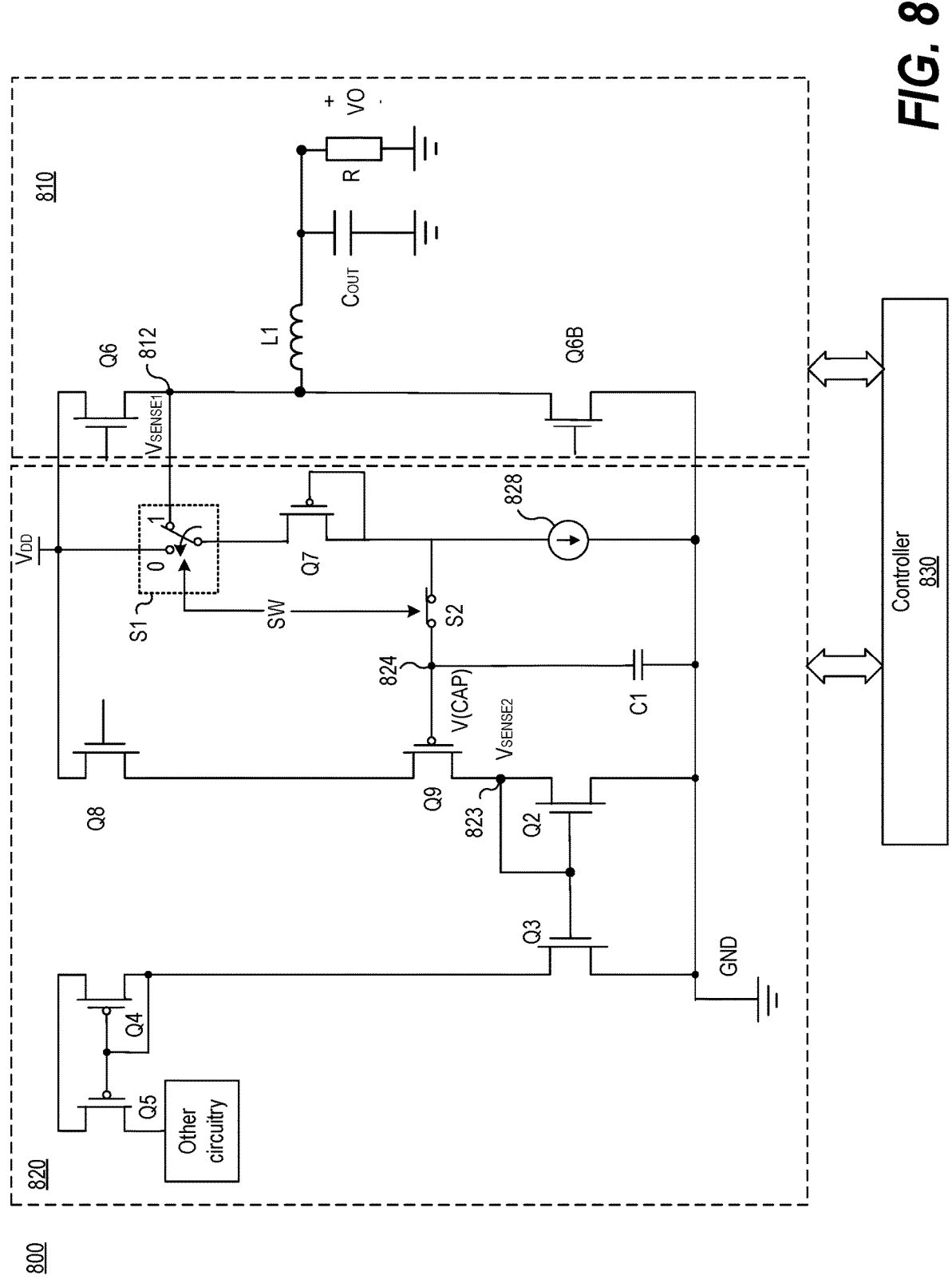
FIG. 8 is schematic diagram of a power converter according to embodiments of the present disclosure.

FIG. 8 is schematic diagram of a power converter 800 according to embodiments of the present disclosure. Power converter 800 may include a regulator 810, a sensing circuit 820, and a controller 830 for controlling regulator 810 and sensing circuit 820. One difference between power converter 800 and power converter 400 illustrated in FIG. 4 is that sensing circuit 820 of power converter 800 includes a transistor Q7 and a current source 828, instead of the op amp OP.

Specifically, in sensing circuit 820 illustrated in FIG. 8, transistor Q7 includes a first node selectively coupled to a first input sensing node 812 of sensing circuit 820 via first switch S1, and a second node coupled to the current source 828. Transistor Q9 includes a first node coupled to a second input sensing node 823 of sensing circuit 820, and a control node (i.e., gate node) coupled to internal node 824. Capacitor C1 includes a first node coupled to internal node 824 and a second node connected to ground GND. Second switch S2 is arranged between the control node of transistor Q9 and the second node of transistor Q7, During a first period, first switch S1 may be controlled by controller 830 to connect the first node of transistor Q7 to first input sensing node 812, and second switch S2 may be controlled by controller 830 to be closed to connect the control node of transistor Q9 to the second node of transistor Q7. As a result, a feedforward circuit is formed for tracking an input signal $V_{SENSE1}$ at first input sensing node 812 to provide a sensing signal $V_{SENSE2}$ at second input sensing node 823, and a voltage across capacitor C1 is created.

During a second period following the first period, first switch S1 may be controlled by controller 830 to connect the first node of transistor Q7 to VDD, and second switch S2 may be controlled by controller 830 to be opened to disconnect the control node of transistor Q9 from the second node of transistor Q7. As a result, the feedforward circuit is cut, thereby maintaining the voltage V(CAP) across capacitor C1.

In some embodiments, because sensing circuit 820 does not include an op amp, the speed of sensing circuit 820 may be increased, such that it is unnecessary to include first switch S1 in sensing circuit 820. In such case, as soon as controller 830 closes high-side switch Q6, opens low-side switch Q6B, and closes switch S2, sensing circuit 820 may start to sense the input signal $V_{SENSE1}$ at first input sensing node 812.

Disclosed methods and operations may be implemented in hardware, software instructions, or a combination of the two. In some embodiments, functionality (e.g., operations of controllers 130, 230, 730, and 830 in FIGS. 1, 2, 7, and 8) may be implemented in fixed circuitry, such as with the circuitry discussed throughout this disclosure or other application-specific integrated circuitry. In some embodiments, methods and process may be implemented through programmable instructions, such as volatile memory, nonvolatile memory, hard-coded media, and other mechanisms to store software instructions. In some embodiments, methods and process may be implemented in a combination of hardware and software. For example, fixed circuitry may be operated by a programmable controller. The controller may load instructions from on-board or off-board storage in order to control circuitry to collectively perform disclosed methods and process.

Disclosed embodiments may include power converters. The power converters may be switched-inductor power converters or regulators, such as a buck converter, a boost converter, a buck-boost converter, a flyback converter, etc. The advantages and benefits of power converters may enable them to be used in a wide array of applications. For example, applications of switching power converters include portable device, mobile computing, and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IOT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, use in electric vehicles of all types (e.g., for drive trains, control systems, and/or infotainment systems), and other devices and systems that utilize portable electricity generating sources and/or require power conversion.

Disclosed embodiments may include power converters that utilize specific types of capacitors, particularly for the fly capacitors. For example, it may be useful for fly capacitors to have low equivalent series resistance (ESR), low DC bias degradation, high capacitance, and/or small volume. Low ESR may be of particular importance for switched-capacitor power converters that incorporate additional switches and fly capacitors to increase the number of voltage levels. Disclosed embodiments may include a particular capacitor based on a consideration of specifications for power level, efficiency, size, etc. Various types of capacitor technologies may be used, including ceramic (including multi-layer ceramic capacitors (MLCC)), electrolytic capacitors, film capacitors (including power film capacitors), and IC-based capacitors. Capacitor dielectrics may vary as needed for particular applications, and may include dielectrics that are paraelectric, such as silicon dioxide ($SiO_2$), hafnium dioxide (HFO2), or aluminum oxide $Al_2O_3$. In addition, switched-capacitor power converter designs may beneficially utilize intrinsic parasitic capacitances (e.g., intrinsic to the power FETs) in conjunction with or in lieu of designed capacitors to reduce circuit size and/or increase circuit performance. Disclosed embodiments may also select capacitors for the power converters based on capacitor component variations, reduced effective capacitance with DC bias, and ceramic capacitor temperature coefficients (e.g., minimum and maximum temperature operating limits, and capacitance variation with temperature).

Similarly, in various embodiments of power converters, it may be beneficial to use specific types of inductors. For example, disclosed embodiments may include inductors that have low DC equivalent resistance, high inductance, and small volume to increase performance.

Disclosed embodiments may include one or more controllers to control, for example, the startup and operation of disclosed embodiments. Controller(s) may be implemented as a microprocessor, a microcontroller, a digital signal processor (DSP), register-transfer level (RTL) circuitry, and/or combinatorial logic.

Disclosed embodiments may include one or more MOSFETs. In embodiments, a MOSFET may refer to any field effect transistor (FET) having an insulated gate whose voltage determines the conductivity of the transistor. In some embodiments, MOSFETS may encompass insulated gates having a metal or metal-like, insulator, and/or semiconductor structure. The metal or metal-like structures may include at least one electrically conductive material (such as aluminum, copper, or other metal, or highly doped polysilicon, graphene, or other electrical conductor). The insulator structures may include at least one insulating material (such as silicon oxide or other dielectric material). The semiconductor structures may include at least one semiconductor material.

Disclosed embodiments can meet a wide variety of specifications and may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. Fabrication in CMOS using SOI or SOS processes may enable circuits with low power consumption, the ability to withstand high power signals during operation due to FET stacking, good linearity, and high frequency operation (e.g., radio frequencies up to and exceeding 300 GHz). Monolithic IC implementation may be useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Disclosed embodiments may adjust component voltage, current, and power handling capabilities as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present disclosure may be used alone or in combination with other components, circuits, and devices. Embodiments may be fabricated as integrated circuits (ICs), which may be encased in IC packages and/or in modules for ease of handling, manufacture, and/or improved performance. For example, IC embodiments of the present disclosure may be used in modules in which one or more of such ICs are combined with other circuit components or blocks (e.g., filters, amplifiers, passive components, and possibly additional ICs) into one package. The ICs and/or modules may be then combined with other components, such as on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs may enable a mode of communication, such as wireless communication.

Embodiments may include implementations in hardware or software, or a combination of both (e.g., programmable logic arrays). In some embodiments, various general purpose computing machines may be used with programs written in accordance with the teachings herein. In other embodiments, a special purpose computer or special-purpose hardware (such as integrated circuits) may be used to perform particular functions. Embodiments may be implemented in one or more computer programs (i.e., a set of instructions or codes) executing on one or more programmed or programmable computer systems (which may be of various architectures, such as distributed, client/server, or grid) each including, for example, at least one processor, at least one data storage system (which may include volatile and non-volatile memory and/or storage elements), at least one input device or port, and/or at least one output device or port. Program instructions or code may be applied to input data to perform the functions described herein and generate output information. The output information may be applied to one or more output devices.

In the specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not to be considered essential features of those embodiments unless the embodiment is inoperative without those elements.

The embodiments may further be described using the following clauses:

1. An integrated circuit (IC) for controlling a power converter, the power converter including a sensing circuit that includes: an op amp having a first input node, a second input node connected to an output node of the sensing circuit, and an output node; a transistor having a first node connected to the output of the sensing circuit, and a control node; a capacitor having a first node connected to the control node of the transistor and a second node connected to ground; a first switch selectively connecting the first input node of the op amp to an input node of the sensing circuit; and a second switch coupled between the output node of the op amp and the first node of the capacitor, the IC comprising:
a controller that,
in a first sensing period, enables the sensing circuit and controls the second switch to electrically connect the output node of the op amp and the first node of the capacitor, creating a first voltage across the capacitor;
in a period between the first sensing period and a second sensing period, disables the sensing circuit and controls the second switch to disconnect the output node of the op amp and the first node of the capacitor to maintain the first
voltage across the capacitor; and in the second sensing period, enables the sensing circuit and controls the second switch to connect the output node of the op amp and the first node of the capacitor, the maintained first voltage across the capacitor reducing the settling time for the enabled sensing circuit.
2. The IC of clause 1, wherein the controller further controls the first switch to electrically connect the first input node of the op amp to ground in the period between the first sensing period and the second sensing period.
3. The IC of clause 1, wherein the first switch is a single-pole, double throw switch.
4. The IC of clause 1, wherein the second switch is a single-pole, single throw switch.
5. The IC of clause 1, wherein the first switch is further arranged between the first input node of the op amp and a pre-biasing circuit having a voltage source.
6. The IC of clause 5, wherein the controller further controls the first switch to electrically connect the first input node of the op amp to the pre-biasing circuit that, before the first period occurs, is connected to and provides a predetermined voltage to the first input node of the op amp to reduce settling time of the capacitor in the first period.
7. The IC of clause 6, wherein the input node has a voltage of less than 20 mV.
8. The IC of clause 7, wherein the voltage source has a voltage between 5 mV and 10 mV.
9. The IC of clause 1, wherein each of the first sensing period and the second sensing period is less than 20 nanoseconds.
10. The IC of clause 1, wherein the controller selectively enables or disables the sensing circuit based on a control signal switching at a frequency of 50 MHz.
11. A power converter, comprising:
a regulator;
a sensing circuit including an input node coupled to the regulator, the sensing circuit including:
an op amp including a first input node, a second input node connected to an output node of the sensing circuit, and an output node;
a transistor including a first node coupled to the output node of the sensing circuit, and a control node;
a capacitor including a first node coupled to the control node of the transistor and a second node connected to ground;

a first switch arranged between the input node of the sensing circuit and the first input node of the op amp; and a second switch arranged between the output node of the op amp and the first node of the capacitor; and a controller to:

in a first period, output a control signal in a first state to electrically connect the input node of the sensing circuit and the first input node of the op amp via the first switch, and electrically connect the output node of the op amp and the first node of the capacitor, via the second switch; and in a second period following the first period, output the control signal in a second state to electrically connect the first input node of the op amp to a reference voltage via the first switch, and electrically isolate the output node of the op amp from the first node of the capacitor by opening the second switch to hold a voltage across the capacitor during the second period.

12. The power converter of clause 11, wherein in the second period, the controller controls the first switch to electrically connect the first input node of the op amp to ground.

13. The power converter of clause 11, wherein the first switch is a single-pole, double throw switch.

14. The power converter of clause 11, wherein the second switch is a single-pole, single throw switch.

15. The power converter of clause 11, further comprising a pre-biasing circuit including a voltage source that, before the first period occurs, is connected to and provides a predetermined voltage to the first input node of the op amp to reduce settling time of the capacitor in the first period.

16. The power converter of clause 15, wherein in the second period, the pre-biasing circuit is coupled to the first input node of the op amp to provide a biasing voltage to hold the voltage across the capacitor during the second period.

17. The power converter of clause 15, wherein in the second period, the controller controls the first switch to electrically connect the first input node of the op amp to the pre-biasing circuit.

18. The power converter of clause 17, wherein the input node has a voltage of less than 20 mV.

19. The power converter of clause 18, wherein the voltage source has a voltage between 5 and 10 mV.

20. The power converter of clause 11, wherein the first period is less than 20 nanoseconds.

21. A method for controlling a power converter that includes a sensing circuit that includes an op amp having a first input node, a second input node coupled to an output node of the sensing circuit, and an output node; a transistor having a first node coupled to the output node; a capacitor coupled between a control node of the transistor and ground; a first switch arranged between an input node of the sensing circuit and the first input node of the op amp; and a second switch arranged between the output node of the op amp and the capacitor, the method comprising:

in a first sensing period, enabling the sensing circuit and controlling the second switch to electrically connect the output node of the op amp and the first node of the capacitor to create a first voltage across the capacitor; and in a period between the first sensing period and a second sensing period, disabling the sensing circuit and controlling the second switch to disconnect the output node of the op amp and the first node of the capacitor to maintain the first voltage across the capacitor, so that the maintained first voltage across the capacitor reduces the settling time for the sensing circuit after the sensing circuit is enabled in the second sensing period.

22. A sensing circuit for a power converter, the sensing circuit including:

an op amp including a first input node, a second input node connected to an output node of the sensing circuit, and an output node;

a transistor including a first node coupled to the output node of the sensing circuit, and a control node;

a capacitor including a first node coupled to the control node of the transistor and a second node connected to ground;

a first switch arranged between an input node of the sensing circuit and the first input node of the op amp; and a second switch arranged between the output node of the op amp and the first node of the capacitor, wherein the sensing circuit operates alternatively between a first period enabling sensing and a second period disabling sensing, wherein:

during the first period, both of the first switch and the second switch are closed to form a feedback control loop for tracking an input signal of the sensing circuit to provide an output signal of the sensing circuit; and during the second period, both of the first switch and the second switch are opened to cut off the feedback control loop to maintain the voltage across the capacitor.

23. A controller for controlling a sensing circuit for a power converter, the sensing circuit including:

an op amp including a first input node, a second input node connected to an output node of the sensing circuit, and an output node;

a transistor including a first node coupled to the output node of the sensing circuit, and a control node;

a capacitor including a first node coupled to the control node of the transistor and a second node connected to ground;

a first switch arranged between an input node of the sensing circuit and the first input node of the op amp; and a second switch arranged between the output node of the op amp and the first node of the capacitor, wherein the controller is to control the first switch and the second switch in the sensing circuit to close a feedback control loop during a first period so that the sensing circuit provides an output voltage tracking an input voltage of the sensing circuit, and to cut off the feedback control loop to maintain a voltage across the capacitor during a second period, so that the maintained voltage across the capacitor reduces a settling time for the sensing circuit after the sensing circuit is enabled in next first period.

24. A sensing circuit for a power converter, comprising:

a first transistor including a first node selectively coupled to a first input sensing node of the sensing circuit, and a second node coupled to a current source;

a second transistor including a first node coupled to a second input sensing node of the sensing circuit, and a control node;

a capacitor including a first node coupled to the control node of the second transistor and a second node connected to ground; and a first switch arranged between the control node of the second transistor and the second node of the first transistor, wherein during a first period, the first switch is closed to connect the control node of the second transistor to the second node of the first transistor, forming a feedforward circuit for tracking an input signal at the first input sensing node of the sensing circuit to provide a sensing signal at the second input sensing node of the sensing circuit, and creating a voltage across the capacitor, and during a second period following the first period, the first switch is opened to disconnect the control node of the second transistor from the second node of the first transistor, cutting of the feedforward circuit and maintaining the voltage across the capacitor.

25. The sensing circuit of clause 24, wherein the first switch is a single pole single throw switch.

26. The sensing circuit of clause 24, wherein the sensing circuit further comprises:

a second switch arranged between the first node of the first transistor and the first input sensing node of the sensing circuit.

27. The sensing circuit of clause 26, wherein the second switch is a single pole double throw switch having an input connected to the first node of the first transistor, a first output connected to the first input sensing node of the sensing circuit, and a second output connected to the power source.

28. The sensing circuit of clause 27, wherein during the first period, the input of the second switch is connected to the first output of the second switch, to electrically connect the first node of the first transistor to the first input sensing node of the sensing circuit.

29. The sensing circuit of clause 24, wherein the sensing circuit operates alternatively between the first period and the second period.

30. The sensing circuit of clause 24, wherein the first period is less than 20 nanoseconds.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) for controlling a power converter, the power converter including a sensing circuit that includes: an op amp having a first input node, a second input node connected to an output node of the sensing circuit, and an output node; a transistor having a first node connected to the output of the sensing circuit, and a control node; a capacitor having a first node connected to the control node of the transistor and a second node connected to ground; a first switch selectively connecting the first input node of the op amp to an input node of the sensing circuit; and a second switch coupled between the output node of the op amp and the first node of the capacitor, the IC comprising:

a controller that, in a first sensing period, enables the sensing circuit and controls the second switch to electrically connect the output node of the op amp and the first node of the capacitor, creating a first voltage across the capacitor;

in a period between the first sensing period and a second sensing period, disables the sensing circuit and controls the second switch to disconnect the output node of the op amp and the first node of the capacitor to maintain the first voltage across the capacitor; and in the second sensing period, enables the sensing circuit and controls the second switch to connect the output node of the op amp and the first node of the capacitor, the maintained first voltage across the capacitor reducing a settling time for the enabled sensing circuit.

2. The IC of claim 1, wherein the controller further controls the first switch to electrically connect the first input node of the op amp to ground in the period between the first sensing period and the second sensing period.

3. The IC of claim 1, wherein the first switch is a single-pole, double throw switch.

4. The IC of claim 1, wherein the second switch is a single-pole, single throw switch.

5. The IC of claim 1, wherein the first switch is further arranged between the first input node of the op amp and a pre-biasing circuit having a voltage source.

6. The IC of claim 5, wherein the controller further controls the first switch to electrically connect the first input node of the op amp to the pre-biasing circuit that, before the first period occurs, is connected to and provides a predetermined voltage to the first input node of the op amp to reduce settling time of the capacitor in the first period.

7. The IC of claim 6, wherein the input node has a voltage of less than 20 mV.

8. The IC of claim 7, wherein the voltage source has a voltage between 5 mV and 10 mV.

9. The IC of claim 1, wherein each of the first sensing period and the second sensing period is less than 20 nanoseconds.

10. The IC of claim 1, wherein the controller selectively enables or disables the sensing circuit based on a control signal switching at a frequency of 50 MHz.

11. A power converter, comprising:

a regulator;

a sensing circuit including an input node coupled to the regulator, the sensing circuit including:

an op amp including a first input node, a second input node connected to an output node of the sensing circuit, and an output node;

a transistor including a first node coupled to the output node of the sensing circuit, and a control node;

a capacitor including a first node coupled to the control node of the transistor and a second node connected to ground;

a first switch arranged between the input node of the sensing circuit and the first input node of the op amp; and a second switch arranged between the output node of the op amp and the first node of the capacitor; and a controller to:

in a first period, output a control signal in a first state to electrically connect the input node of the sensing circuit and the first input node of the op amp via the first switch, and electrically connect the output node of the op amp and the first node of the capacitor, via the second switch; and in a second period following the first period, output the control signal in a second state to electrically connect the first input node of the op amp to a reference voltage via the first switch, and electrically isolate the output node of the op amp from the first node of the capacitor by opening the second switch to hold a voltage across the capacitor during the second period.

12. The power converter of claim 11, wherein in the second period, the controller controls the first switch to electrically connect the first input node of the op amp to ground.

13. The power converter of claim 11, wherein the first switch is a single-pole, double throw switch.

14. The power converter of claim 11, wherein the second switch is a single-pole, single throw switch.

15. The power converter of claim 11, further comprising a pre-biasing circuit including a voltage source that, before the first period occurs, is connected to and provides a predetermined voltage to the first input node of the op amp to reduce settling time of the capacitor in the first period.

16. The power converter of claim 15, wherein in the second period, the pre-biasing circuit is coupled to the first input node of the op amp to provide a biasing voltage to hold the voltage across the capacitor during the second period.

17. The power converter of claim 15, wherein in the second period, the controller controls the first switch to electrically connect the first input node of the op amp to the pre-biasing circuit.

18. The power converter of claim 17, wherein the input node has a voltage of less than 20 mV.

19. The power converter of claim 18, wherein the voltage source has a voltage between 5 and 10 mV.

20. The power converter of claim 11, wherein the first period is less than 20 nanoseconds.

21. A method for controlling a power converter that includes a sensing circuit that includes an op amp having a first input node, a second input node coupled to an output node of the sensing circuit, and an output node; a transistor having a first node coupled to the output node; a capacitor coupled between a control node of the transistor and ground; a first switch arranged between an input node of the sensing circuit and the first input node of the op amp; and a second switch arranged between the output node of the op amp and the capacitor, the method comprising:

in a first sensing period, enabling the sensing circuit and controlling the second switch to electrically connect the output node of the op amp and the first node of the capacitor to create a first voltage across the capacitor; and in a period between the first sensing period and a second sensing period, disabling the sensing circuit and controlling the second switch to disconnect the output node of the op amp and the first node of the capacitor to maintain the first voltage across the capacitor, so that the maintained first voltage across the capacitor reduces a settling time for the sensing circuit after the sensing circuit is enabled in the second sensing period.

* * * * *

UNITED STATES PATENT AND TRADEMARK OFFICE
CERTIFICATE OF CORRECTION

| | | |
|---|---|---|
| PATENT NO. | : 12,062,973 B2 | Page 1 of 1 |
| APPLICATION NO. | : 17/656549 | |
| DATED | : August 13, 2024 | |
| INVENTOR(S) | : Tim Wen Hui Yu and Gregory Szczeszynski | |

It is certified that error appears in the above-identified patent and that said Letters Patent is hereby corrected as shown below:

In the Specification

In the DETAILED DESCRIPTION:

Column 7, Line 22 change "(e.g., Vi)" to --(e.g., $V_1$)--.

Signed and Sealed this
Twenty-fourth Day of June, 2025

Coke Morgan Stewart
*Acting Director of the United States Patent and Trademark Office*